United States Patent
Li

(10) Patent No.: US 10,868,884 B2
(45) Date of Patent: Dec. 15, 2020

(54) SYSTEM FOR DETERMINING WHETHER TO CACHE DATA LOCALLY AT CACHE SERVER BASED ON ACCESS FREQUENCY OF EDGE SERVER

(71) Applicant: HUAWEI TECHNOLOGIES CO., LTD., Guangdong (CN)

(72) Inventor: Runhui Li, Shenzhen (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/587,889

(22) Filed: Sep. 30, 2019

(65) Prior Publication Data

US 2020/0028933 A1 Jan. 23, 2020

Related U.S. Application Data

(63) Continuation of application No. PCT/CN2018/089000, filed on May 30, 2018.

(30) Foreign Application Priority Data

Jun. 2, 2017 (CN) .......................... 2017 1 0409582

(51) Int. Cl.
*H04L 29/08* (2006.01)
*H04L 12/863* (2013.01)
*H04L 29/06* (2006.01)

(52) U.S. Cl.
CPC .......... *H04L 67/2852* (2013.01); *H04L 29/06* (2013.01); *H04L 29/08* (2013.01);
(Continued)

(58) Field of Classification Search
CPC ..... H04L 29/06; H04L 29/08; H04L 47/6235; H04L 47/6245; H04L 63/10;
(Continued)

(56) References Cited

U.S. PATENT DOCUMENTS

| 8,543,702 B1 | 9/2013 | Marshall et al. |
| 2002/0092026 A1* | 7/2002 | Janniello ............. H04L 67/1095 725/86 |

(Continued)

FOREIGN PATENT DOCUMENTS

| CN | 103139301 A | 6/2013 |
| CN | 103150347 A | 6/2013 |

(Continued)

OTHER PUBLICATIONS

Extended European Search Report issued in European Application No. 18810856.7 dated Nov. 11, 2019, 8 pages.

(Continued)

*Primary Examiner* — Le H Luu
(74) *Attorney, Agent, or Firm* — Fish & Richardson P.C.

(57) ABSTRACT

The present disclosure relates to data access methods and apparatus. One example method includes sending, by a first cache server, a first access request to a second cache server, where the first access request is used to request first data, and the first access request is from a first edge server, receiving, by the first cache server, a copy of the first data and a first access frequency that are returned by the second cache server, where the first access frequency is a frequency at which the first edge server accesses the first data and that is recorded by the second cache server, determining, by the first cache server, whether a second access frequency lower than the first access frequency exists, and in response to determining that the second access frequency exists, caching, by the first cache server, the copy of the first data.

18 Claims, 8 Drawing Sheets

(52) U.S. Cl.
CPC ...... *H04L 47/6235* (2013.01); *H04L 47/6245* (2013.01); *H04L 63/10* (2013.01); *H04L 67/2842* (2013.01); *H04L 67/32* (2013.01)

(58) Field of Classification Search
CPC . H04L 67/2842; H04L 67/2852; H04L 67/32; H04L 67/1095; H04L 67/2861; H04L 41/0893; G06F 16/183; G06F 16/9574; G06F 3/0608; H04N 21/25825
See application file for complete search history.

(56) References Cited

U.S. PATENT DOCUMENTS

| | | | |
|---|---|---|---|
| 2003/0065743 A1 | 4/2003 | Jenny et al. | |
| 2003/0115421 A1* | 6/2003 | McHenry | H04L 29/06 711/133 |
| 2010/0146083 A1* | 6/2010 | Vidwans | H04L 67/2861 709/219 |
| 2013/0326022 A1* | 12/2013 | Ehrlich | G06F 16/9574 709/219 |
| 2014/0122637 A1* | 5/2014 | Wan | H04L 67/2842 709/213 |
| 2014/0229523 A1 | 8/2014 | Ozawa | |
| 2016/0134917 A1 | 5/2016 | Hardin | |
| 2017/0010824 A1* | 1/2017 | Vidwans | G06F 3/0608 |
| 2017/0277805 A1* | 9/2017 | Li | G06F 16/183 |
| 2018/0359335 A1* | 12/2018 | Du | H04L 41/0893 |
| 2019/0028743 A1* | 1/2019 | He | H04N 21/25825 |

FOREIGN PATENT DOCUMENTS

| | | |
|---|---|---|
| CN | 103716254 A | 4/2014 |
| CN | 105138587 A | 12/2015 |
| EP | 2365442 A1 | 9/2011 |

OTHER PUBLICATIONS

Office Action issued in Chinese Application No. 201710409582.2 dated Dec. 13, 2019, 10 pages (with English translation).

Search Report issued in Chinese Application No. 201710409582.2 dated Dec. 4, 2019, 2 pages.

Nygren et al., "The Akamai network: a platform for high-performance Internet applications", ACM SIGOPS Operating Systems Review, vol. 44 Issue 3, Jul. 2010, 18 pages.

Adhikari et al., "Vivisecting YouTube: An active measurement study", IEEE INFOCOM, 2012, 5 pages.

Fayazbakhsh et al., "Less pain, most of the gain: incrementally deployable ICN", ACM SIGCOMM, 2013, 12 pages.

International Search Report and Written Opinion in International Application No. PCT/CN2018/089,000 dated Sep. 4, 2018, 12 pages (With Partial English Translation).

* cited by examiner

SYSTEM FOR DETERMINING WHETHER TO CACHE DATA LOCALLY AT CACHE SERVER BASED ON ACCESS FREQUENCY OF EDGE SERVER

CROSS-REFERENCE TO RELATED APPLICATIONS

This application is a continuation of International Application No. PCT/CN2018/089000, filed on May 30, 2018, which claims priority to Chinese Patent Application No. 201710409582.2, filed on Jun. 2, 2017. The disclosures of the aforementioned applications are hereby incorporated by reference in their entireties.

TECHNICAL FIELD

This application relates to the field of data caching, and more specifically, to a data access method and apparatus.

BACKGROUND

A content delivery network includes a data server and geographically dispersed cache servers, and the data server and the cache servers are organized in a hierarchical structure. The data server is located at a top layer while the cache servers are distributed at layers below the data server. The data server stores data, and the cache servers provide a caching service for the data stored in the data server. When a user requests data, an access request is first initiated to a geographically adjacent cache server (referred to as an edge cache server). The edge cache server checks whether the data requested by the user is locally cached. If the data requested by the user is cached, the edge cache server directly returns the data to the user. If the data requested by the user is not cached, the edge cache server redirects the access request to a cache server at an upper layer until a cache server in which the data requested by the user is cached is found. Then the data is returned to the user along an original request path.

In a process of returning the data along the original request path, cache servers at layers on the request path independently determine whether to cache the returned data. In this way, the data may be cached in different cache servers, increasing overheads of network resources and causing a waste of storage resources.

SUMMARY

This application provides a data access method and apparatus, to reduce a waste of storage resources.

According to a first aspect, this application provides a data access method. The method includes: sending, by a first cache server, a first access request to a second cache server, where the first access request is used to request first data, and the first access request is from a first edge server; receiving, by the first cache server, a copy of the first data and a first access frequency that are returned by the second cache server, where the first access frequency is a frequency at which the first edge server accesses the first data and that is recorded by the second cache server; determining, by the first cache server, whether a second access frequency lower than the first access frequency exists, where the second access frequency is a frequency at which the first edge server accesses second data and that is recorded by the first cache server, and the second data is locally cached in the first cache server; and if the second access frequency exists, caching, by the first cache server, the copy of the first data.

In a possible implementation, the method further includes: requesting, by the first cache server, the second cache server to swap cache locations of the first data and the second data.

In a possible implementation, the requesting, by the first cache server, the second cache server to swap cache locations of the first data and the second data includes: sending, by the first cache server, swap signaling to the second cache server, where the swap signaling carries a copy of the second data and information that indicates the second access frequency, so that the second cache server deletes the first data cached for the first edge server and caches the second data; and caching, by the first cache server, the first data, and deleting the second data locally cached for the first edge server.

In a possible implementation, the method further includes: recording, by the first cache server, the first access frequency.

In a possible implementation, the first cache server stores a cache queue, the cache queue stores an access frequency of each piece of locally cached data, and the access frequencies of the data in the cache queue are arranged in ascending or descending order; and the determining, by the first cache server, whether a second access frequency lower than the first access frequency exists includes: determining, by the first cache server, whether a lowest access frequency in the cache queue is lower than the first access frequency; and if the lowest access frequency in the cache queue is higher than the first access frequency, determining, by the first cache server, that the second access frequency does not exist; or if the lowest access frequency in the cache queue is lower than the first access frequency, determining, by the first cache server, that the second access frequency exists.

In a possible implementation, the first access request carries identification information of the first edge server, to indicate that the first access request is from the first edge server.

According to a second aspect, this application provides a data access method. The method includes: receiving, by a second cache server, a first access request sent by a first cache server, where the first access request is used to request first data, and the first access request is from a first edge server; and when determining that the first data is locally cached, returning, by the second cache server, a copy of the first data and a first access frequency to the first cache server, where the first access frequency is a frequency at which the first edge server accesses the first data and that is recorded by the second cache server.

In a possible implementation, the method further includes: receiving, by the second cache server, swap signaling sent by the first cache server, where the swap signaling carries a copy of second data and information that indicates a second access frequency, the swap signaling is sent to the second cache server when the first cache server determines that the second access frequency locally exists, the second access frequency is lower than the first access frequency, the second access frequency is a frequency at which the first edge server accesses the second data and that is recorded by the first cache server, and the second data is locally cached in the first cache server; and deleting, by the second cache server based on the swap signaling, the first data locally cached for the first edge server, and locally caching the second data.

Herein, it should be noted that the deleting, by the second cache server, the first data locally cached for the first edge server is logical deletion. If for another edge server at a layer below the second cache server, the first data does not need to be cached in the second cache server, the second cache server not only logically but also physically deletes the first data for the first edge server. If for an edge server (for example, an edge server # A) at a layer below the second cache server, the first data needs to be cached in the second cache server, the deleting the first data for the first edge server herein is merely logical deletion. Physically, the copy of the first data is still stored in the second cache server. In this case, the copy of the first data is cached not for the first edge server but for the edge server # A.

In a possible implementation, the method further includes: recording, by the second cache server, the second access frequency.

In a possible implementation, the first access request carries identification information of the first edge server, to indicate that the first access request is from the first edge server.

In a possible implementation, before the deleting, by the second cache server based on the swap signaling, the first data locally cached for the first edge server, the method further includes: receiving, by the second cache server, a second access request sent by a third cache server, where the second access request is used to request the first data, and the second access request is from a second edge server; and returning, by the second cache server, the copy of the first data and a third access frequency to the third cache server, where the third access frequency is a frequency at which the second cache edge server accesses the first data and that is recorded by the second cache server.

The third cache server herein is a lower-layer server of the second cache server, and may be located at a layer that is the same as or different from a layer at which the first cache server is located.

The second access request carries identification information of the second edge server, to indicate that the second access request is from the second edge server.

In a possible implementation, before the returning, by the second cache server, a copy of the first data and a first access frequency to the first cache server, the method further includes: updating, by the second cache server, a recorded historical frequency at which the first edge server accesses the first data, to obtain the first access frequency, where the first access frequency is a frequency at which the first edge server accesses the first data, counting the first access request.

The historical access frequency herein is a quantity of times that the first edge server accesses the first data and that is recorded by the second cache server before the second cache server receives the first access request from the first edge server.

According to a third aspect, this application provides a data access apparatus, configured to perform the method according to the first aspect or any possible implementation of the first aspect. Specifically, the apparatus includes units that perform the method according to the first aspect or any possible implementation of the first aspect.

According to a fourth aspect, this application provides a data access apparatus, configured to perform the method according to the second aspect or any possible implementation of the second aspect. Specifically, the apparatus includes units that perform the method according to the second aspect or any possible implementation of the second aspect.

According to a fifth aspect, this application provides a server. The server includes one or more processors, one or more memories, and one or more transceivers (each transceiver includes a transmitter and a receiver). The transmitter sends a signal through an antenna or the receiver receives a signal through an antenna. The memory is configured to store a computer program instruction (or code). The processor is configured to execute the instruction stored in the memory, and when the instruction is executed, the processor performs the method according to the first aspect or any possible implementation of the first aspect.

According to a sixth aspect, this application provides a server. The server includes one or more processors, one or more memories, and one or more transceivers (each transceiver includes a transmitter and a receiver). The transmitter sends a signal through an antenna or the receiver receives a signal through an antenna. The memory is configured to store a computer program instruction (or code). The processor is configured to execute the instruction stored in the memory, and when the instruction is executed, the processor performs the method according to the second aspect or any possible implementation of the second aspect.

According to a seventh aspect, this application provides a computer readable storage medium. The computer readable storage medium stores an instruction, and when the instruction is run on a computer, the computer performs the method according to the first aspect or any possible implementation of the first aspect.

According to an eighth aspect, this application provides a computer readable storage medium. The computer readable storage medium stores an instruction, and when the instruction is run on a computer, the computer performs the method according to the second aspect or any possible implementation of the second aspect.

According to a ninth aspect, this application provides a computer program product. The computer program product includes computer program code, and when the computer program code is run on a computer, the computer performs the method according to the first aspect or any possible implementation of the first aspect.

According to a tenth aspect, this application provides a computer program product. The computer program product includes computer program code, and when the computer program code is run on a computer, the computer performs the method according to the second aspect or any possible implementation of the second aspect.

According to an eleventh aspect, this application further provides a chip (or chip system), including a memory and a processor. The memory is configured to store a computer program, and the processor is configured to invoke the computer program from the memory and run the computer program, so that a network device on which the chip is installed performs the method according to the first aspect or any possible implementation of the first aspect.

According to a twelfth aspect, this application further provides a chip (or chip system), including a memory and a processor. The memory is configured to store a computer program, and the processor is configured to invoke the computer program from the memory and run the computer program, so that a network device on which the chip is installed performs the method according to the second aspect or any possible implementation of the second aspect.

The data access method provided in the embodiments of this application can reduce a waste of storage resources of medium-layer cache servers that is caused when data is repeatedly cached in cache servers at a plurality of layers.

DESCRIPTION OF EMBODIMENTS

The following describes technical solutions of this application with reference to accompanying drawings.

First, concepts in embodiments of this application are briefly described.

A content delivery network is an important component of content delivery. The content delivery network mainly includes a data server and geographically distributed cache servers. The data server stores all data, and the cache servers provide a caching service for the data stored in the data server.

A cache server directly connected to a terminal device is also referred to as an edge server. When a user requests data, a data access request is first initiated to an edge server. After receiving the data access request, the edge server checks whether the data requested by the user is cached in the edge server. If the data requested by the user is cached, the edge server directly returns the data to the user. If the data requested by the user is not cached, the edge server requests, from a medium-layer cache server, the data requested by the user.

Figure 1:
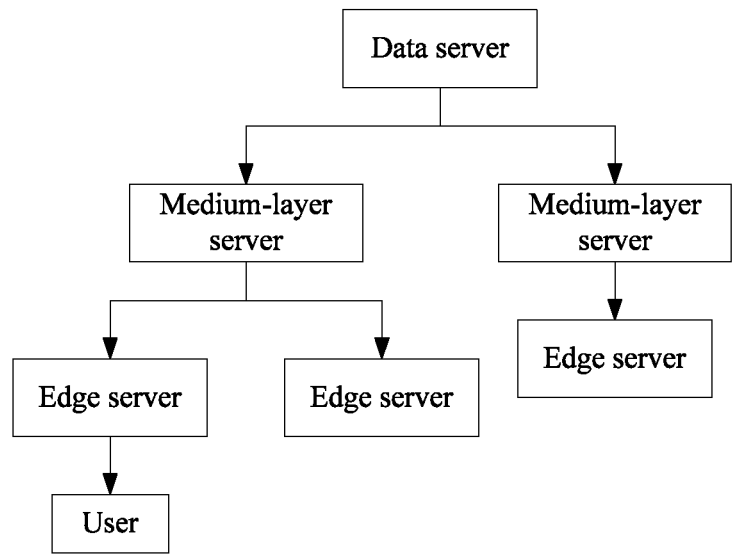
FIG. 1 is a schematic architectural diagram of a content delivery network.

The content delivery network is generally organized in a hierarchical structure. FIG. 1 is a schematic architectural diagram of a content delivery network. A data server is located at the top layer of the hierarchical structure, edge servers are located at the bottom layer of the hierarchical structure, and medium-layer cache servers (referred to as medium-layer servers in the following) are located between the data server and the edge servers.

Figure 2:
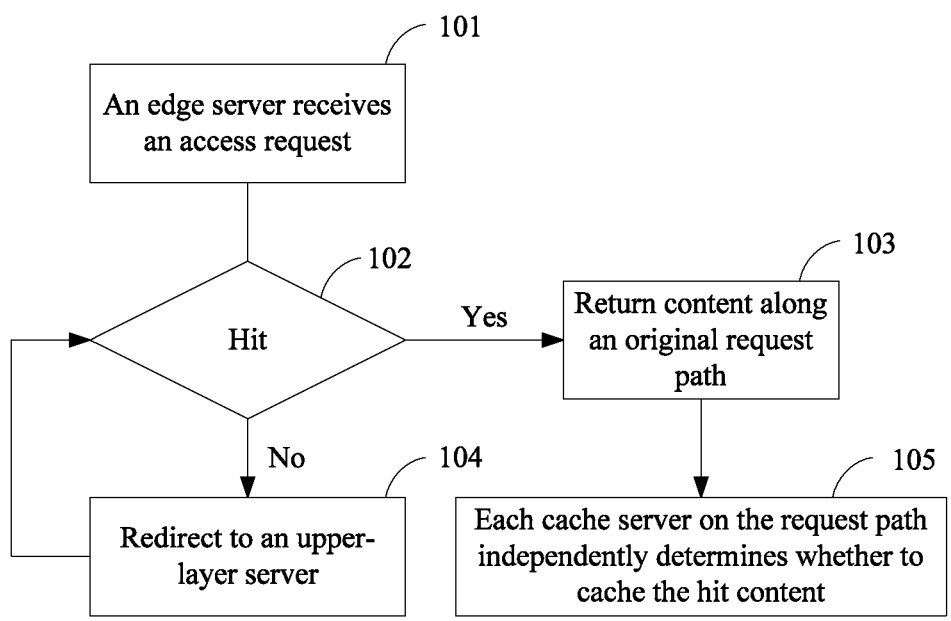
FIG. 2 is a flowchart of a data access process in a content delivery network.

The following describes a data access process in a content delivery network in the prior art with reference to FIG. 2. FIG. 2 is a flowchart of a data access process in a content delivery network.

101. An edge server receives an access request of a user.

It is assumed that the access request is used to request content A.

102. The edge server determines whether content is hit.

The edge server determines whether the content A is locally cached. If the content A is cached, that is, the content A is hit, step 103 is performed. If the content A is not cached, that is, the content A is not hit, step 104 is performed.

103. Return the content along an original request path.

Herein, if the content A is cached in the edge server, the content A is directly returned to the user.

104. The edge server redirects the access request to an upper-layer server.

When the content A is not cached in the edge server, the access request is redirected to the upper-layer server (a medium-layer server) of the edge server. Then, step 102 is performed.

To be specific, the medium-layer server determines whether the content A is hit. If the content A is hit, a copy of the content A is returned to the edge server, and the edge server returns the copy of the content A to the user.

The request path herein is from the edge server to the upper-layer server of the edge server. Therefore, returning the content along the original request path is returning the content from the upper-layer server of the edge server to the edge server.

If the content A is not cached in the upper-layer server of the edge server, the access request is redirected to a medium-layer server at a further upper layer, and the medium-layer server at the further upper layer determines whether the content A is hit; and so on.

105. Each cache server on the request path independently determines whether to cache the hit content.

In other words, each medium-layer server and each edge server on the request path independently determine whether to cache the content A.

Because the cache servers (including the medium-layer server and the edge server) on the request path independently determine whether to cache the content A, it is very likely that the content A is cached in a plurality of different cache servers. Consequently, cache efficiency of the cache servers is relatively low, causing a waste of cache resources.

In view of this, this application provides a data access method, which helps to reduce a waste of cache resources.

The following describes the data access method according to this application in detail with reference to FIG. 3 to FIG. 6.

The data access method provided in this embodiment of this application is provided based on a data cache architecture different from that in the prior art. Therefore, the data cache architecture provided in this embodiment of this application needs to be first described.

Figure 3:
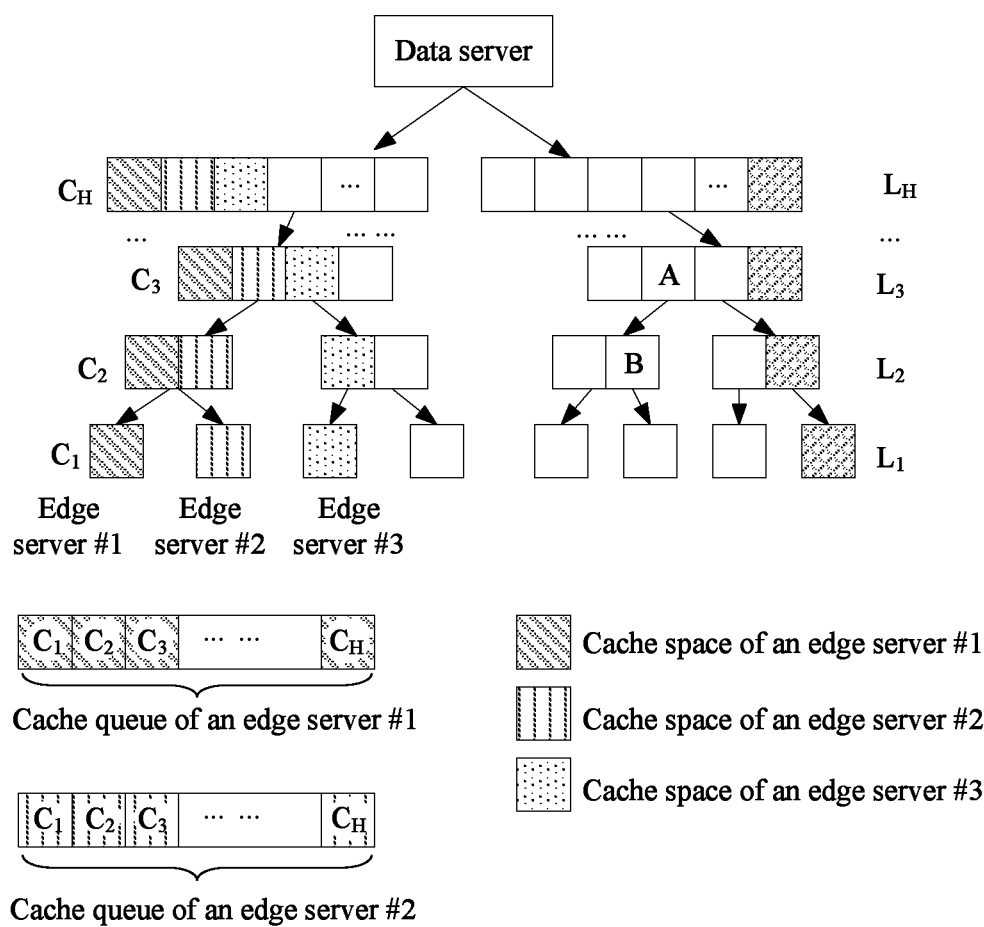
FIG. 3 is a schematic diagram of a data cache architecture according to an embodiment of this application.

FIG. 3 is a schematic diagram of a data cache architecture according to an embodiment of this application. As shown in FIG. 3, a content delivery network includes a data server, medium-layer cache servers, and edge servers. All data is stored in the data server. Cache servers (including the medium-layer cache servers and the edge servers) provide a caching service for the data in the data server. The cache servers are organized in a hierarchical structure, and each upper-layer cache server provides an exclusive cache space for each lower-layer cache server of the upper-layer cache server. The servers may be directly connected to each other through radio, an optical fiber, a cable, or the like.

From the perspective of a particular edge server, exclusive cache spaces provided by medium-layer cache servers for the edge server and a physical cache space of the edge server together form a consecutive cache queue. A head of the cache queue is close to a user; and a tail of the cache queue is close to the data server, or the tail is far from the user.

It may be understood that a cache queue, including exclusive cache spaces, of each edge server is a logical concept. Actually, the cache spaces included in the cache queue are distributed in medium-layer cache servers.

The exclusive cache space herein is logically exclusive. In other words, an exclusive cache space provided by an upper-layer cache server for a lower-layer edge server of the upper-layer cache server may be physically shared by a plurality of lower-layer edge servers of the upper-layer cache server.

In this manner, a logical cache queue of an edge server can be managed in a centralized manner. Logically, for data stored in a cache queue of an edge server, the edge server has only one copy of the data. In this case, same data can be prevented from being cached in a plurality of different cache servers, thereby reducing wastes of storage resources and network resources.

As shown in FIG. 3, the cache servers are distributed at layers $L_1$ to $L_H$. The edge servers are located at the layer $L_1$, and the medium-layer cache servers are at the layers $L_2$ to $L_H$. For an edge server #1, cache spaces provided by the cache servers at the layers $L_1$ to $L_H$ for the edge server #1 form a consecutive cache queue. A head of the queue is close to the user, and a tail of the queue is far from the user. In FIG. 3, a head of a queue is a cache space denoted by $C_1$, and a tail of a queue is a cache space denoted by $C_H$.

Based on such a cache architecture, this application further provides a data access method. The following describes the data access method provided in this application.

Figure 4:
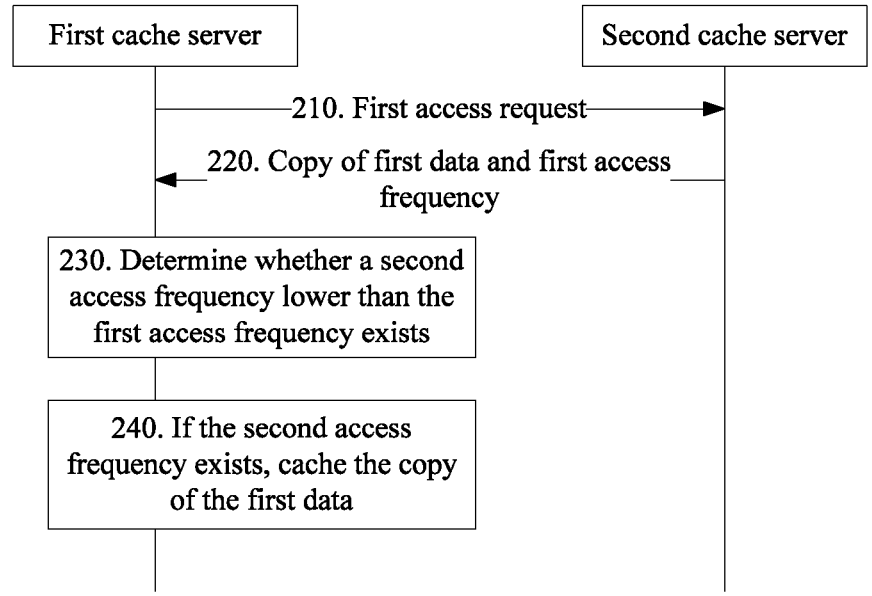
FIG. 4 is a schematic interaction diagram of a data access method 200 according to an embodiment of this application.

FIG. 4 is a schematic interaction diagram of a data access method 200 according to an embodiment of this application. As shown in FIG. 4, the method 200 is performed by a first cache server and a second cache server.

210. The first cache server sends a first access request to the second cache server, and the second cache server receives the first access request.

The first access request is used to request first data, and the first access request is from a first edge server.

The data described in this embodiment of this application may also be referred to as "content" in a content delivery network.

The first cache server and the second cache server described in this embodiment of this application are cache servers at two adjacent layers, the first cache server is a lower-layer server, and the second cache server is an upper-layer server.

Herein, the first access request is from the first edge server. Therefore, it may be considered that the first access request is redirected from the first edge server to the first cache server. To be specific, the first access request is used to request the first data, but the first data is cached in neither the first edge server nor a lower-layer server of the first cache server. Therefore, the first access request is redirected to the first cache server. For example, the first cache server may be an upper-layer server of the first edge server, or may be a medium-layer server at a further upper layer.

The second cache server is a medium-layer server directly connected to the first cache server.

Herein, the first cache server and the second cache server may correspond to two cache servers that are connected to each other and that are at the layer $L_i$ and the layer $L_{i+1}$ in FIG. 3, where i is an integer greater than or equal to 1. For example, a cache server denoted by A and a cache server denoted by B in FIG. 3 are examples of the second cache server and the first cache server respectively.

Optionally, the first access request carries identification information of the first edge server.

In this case, the second cache server that receives the first access request can learn that the first access request is from the first edge server. The first access request is redirected to the first cache server, and therefore the first cache server may learn, based on the identification information of the first edge server, that the first access request is from the first edge server.

220. When first data is cached in the second cache server, the second cache server sends a copy of the first data and a first access frequency to the first cache server, and the first cache server receives the copy of the first data and the first access frequency.

The first access frequency is a frequency at which the first edge server accesses the first data and that is recorded by the second cache server.

The second cache server determines, based on the first access request, whether the first data is locally cached.

If the first data is locally cached, the second cache server returns the cached first data (namely, the copy of the first data) to the first cache server.

In this embodiment of this application, an edge server and each cache server record access frequencies of cached data. For example, if data A, data B, data C, and data D are cached in a cache server, the cache server also records access frequencies of the data A, the data B, the data C, and the data D. The access frequency of each piece of the data is used to represent a quantity of historical times that the user accesses the data. In other words, an access frequency of data can reflect "popularity" of the data. Data with a higher access frequency has a larger quantity of historical access times.

Therefore, in this embodiment of this application, if the first data is cached in the second cache server, the second cache server records the access frequency of the first data.

Herein, it should be noted that the first access frequency is returned to the first cache server after the second cache server receives the first access request. Therefore, the first access frequency is a frequency at which the first edge server accesses the first data, counting the first access request. Alternatively, it may be considered that after receiving the access request for requesting the first data, the second cache server first updates the access frequency of the first data by adding 1 to a locally-recorded quantity of historical times that the first edge server accesses the first data, to obtain the first access frequency, and then returns, to the first cache server, an updated frequency (namely, the first access frequency) at which the first edge server accesses the first data.

It should be noted that in this embodiment of this application, the first access frequency herein is a frequency at which the first edge server accesses the first data. In other words, when a medium-layer cache server records an access frequency of locally cached content, the access frequency is recorded for an edge cache server.

For example, data A is locally cached in a medium-layer cache server. If an edge server #1 requests the data A, and the access request is redirected to the medium-layer cache server, the medium-layer cache server returns an access frequency #1. The access frequency #1 is a quantity, recorded by the medium-layer cache server of historical times that the edge server #1 accesses the data A. If an edge server #2 requests the data A, and the access request is redirected to the medium-layer cache server, the medium-layer cache server returns an access frequency #2. The access frequency #2 is a quantity, recorded by the medium-layer server, of historical times that the edge server #2 accesses the data A. In other words, the access frequency recorded by the medium-layer cache server is for the edge server.

230. The first cache server determines whether a second access frequency lower than the first access frequency exists.

The second access frequency is a frequency at which the first edge server accesses second data and that is recorded by the first cache server. The second data is locally cached in the first cache server.

In step 220, the first cache server receives the copy of the first data and the first access frequency that are returned by the second cache server. In step 230, the first cache server determines whether the second access frequency lower than the first access frequency exists in access frequencies of locally cached data.

The second access frequency is a frequency at which the first edge server accesses the second data cached in the first cache server. For example, data E, data F, and data G are cached in the first cache server, and frequencies at which the first edge server accesses the data E, the data F, and the data G are f1, f2, and f3 respectively. The first cache server determines whether there is a frequency among f1, f2, and f3 lower than the first access frequency. It may be understood that two cases may occur.

Case 1

The second access frequency lower than the first access frequency does not exist.

For the foregoing example, all of f1, f2, and f3 are higher than the first access frequency.

In this case, the first cache server returns the copy of the first data to a cache server at a lower layer, so that the copy of the first data arrives at the first edge server after being forwarded by medium-layer cache servers, and is finally returned to the user by the first edge server. The current access procedure for the first data ends.

Optionally, the first cache server stores a cache queue, the cache queue stores an access frequency of each piece of data locally cached in the first cache server, and the access frequencies of the data in the cache queue are arranged in ascending or descending order; and that the first cache server determines whether a second access frequency lower than the first access frequency exists includes:

determining, by the first cache server, whether a lowest access frequency in the cache queue is lower than the first access frequency; and if the lowest access frequency in the cache queue is higher than the first access frequency, determining, by the first cache server, that the second access frequency does not exist; or if the lowest access frequency in the cache queue is lower than the first access frequency, determining, by the first cache server, that the second access frequency exists.

In this embodiment, each of the cache servers (including the edge server and the medium-layer cache server) stores a cache queue. The cache queue includes an access frequency of each piece of data cached in the cache server, and elements in the cache queue are arranged in ascending or descending order of the access frequencies. For example, in the cache queue, the access frequencies of the data may be arranged in descending order: a highest access frequency is at a head of the queue and a lowest access frequency is at a tail of the queue. Alternatively, in the cache queue, the access frequencies of the data may be arranged in ascending order: a lowest access frequency is at a head of the queue and a highest access frequency is at a tail of the queue.

Maintaining a cache queue on a medium-layer cache server can improve performance efficiency of step 230.

The foregoing example is still used for description. Assuming that f1, f2, and f3 are arranged in descending order and a cache queue (f1, f2, f3) is obtained, f3 is the lowest access frequency. When determining whether the second access frequency lower than the first access frequency exists, the first cache server directly compares the tail element f3 of the cache queue with the first access frequency. If f3 is higher than the first access frequency, the second access frequency lower than the first access frequency definitely does not exist in the cache queue.

Conversely, if f3 is lower than the first access frequency, the second access frequency lower than the first access frequency exists in the cache queue. In this case, the first cache server may compare an access frequency at a penultimate location of the cache queue (for example, f2 in the foregoing example) with the first access frequency. If f2 is higher than the first access frequency, only f3 in the cache queue is lower than the first access frequency, and f3 is used as the second access frequency described in this embodiment of this application, and the data G corresponding to f3 is determined as the second data.

If f2 is lower than the first access frequency, the first cache server further compares an access frequency at an antepenultimate location of the cache queue (for example, f1 in the foregoing example) with the first access frequency. If f1 is higher than the first access frequency, both f2 and f3 in the cache queue are lower than the first access frequency, and the first cache server uses the maximum access frequency (for example, f2 in the foregoing example) between the access frequencies as the second access frequency, and the data F corresponding to f2 is the second data.

When the cache queue includes more elements, a process of determining whether the second access frequency exists and determining the second data is similar. Details are not described herein again.

Based on a solution in which each cache server stores a cache queue, when the first cache server determines that the second access frequency does not exist, after returning the copy of the first data to the second cache server, the first cache server updates the access frequency of the first data. It is assumed that before the first cache server receives the first access request, a frequency m at which the first edge server accesses the first data is maintained on the first cache server. After receiving the first access request from the first edge server, the first cache server adds 1 to the maintained frequency at which the first edge server accesses the first data, that is, updates the maintained frequency to m+1, and adjusts a location of the first data in the cache queue.

In addition, the foregoing first access frequency returned by the first cache server to the second cache server is the updated access frequency. In other words, the first access frequency is a quantity of access times, counting the first access request.

Figure 5:
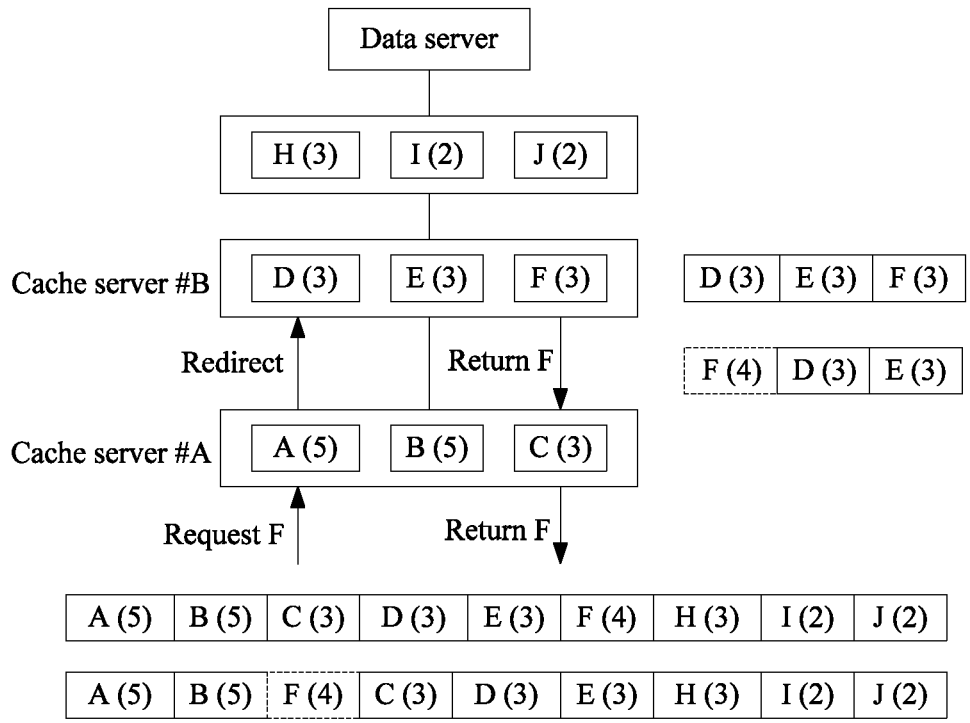
FIG. 5 is a schematic diagram of a process of adjusting a location of a data access frequency in a cache queue.

The following describes, with reference to FIG. 5, a process of updating an access frequency and adjusting a location of a data access frequency in a cache queue with examples.

FIG. 5 is a schematic diagram of a process of adjusting a location of a data access frequency in a cache queue.

(1) A cache server # A receives an access request that is used to request data F and that is sent by a lower-layer cache server.

Herein, the lower-layer cache server from which the cache server # A receives the access request is not shown in FIG. 5.

(2) The cache server # A determines that the data F is not locally cached, and redirects the access request to a cache server # B at an upper layer.

(3) If the data F is cached in the cache server # B, a copy of the data F is returned to the cache server # A.

Before the access request for requesting the data F is received, a quantity of historical access times of the data F is 3. A cache queue maintained on the cache server # B is (D, E, F), and the quantity of access times of the data F is the lowest. After the quantity of access times of the data F is updated, the quantity of access times of the data F becomes 4, which is higher than quantities of access times of data E and data D. Therefore, the cache server # B swaps locations, in the cache queue, of the data F and the data D in the cache queue. The updated cache queue is (F, D, E). In other words, elements in the cache queue are always arranged in descending order of access frequencies.

Further, the cache server # B returns an updated access frequency of the data F to the cache server # A.

(4) The cache server # A returns the copy of the data F to the lower-layer cache server.

Case 2

The second access frequency lower than the first access frequency exists.

In this case, step 240 is performed.

240. If the second access frequency exists, the first cache server caches the copy of the first data.

In the technical solution provided in this application, after the first cache server receives the copy of the first data and the first access frequency that are returned by the second cache server, if the second access frequency lower than the first access frequency locally exists, it indicates that for the first edge server, the first data is more "popular". Therefore, the first cache server may cache the copy of the first data, so that when the access request for requesting the first data is received from the edge server next time, the copy of the first data can be directly returned to the edge server and further returned to the user, and there is no need to redirect the access request to an upper-layer cache server. This reduces a time of responding to a data request of the user and improves cache efficiency.

Further, compared with the foregoing prior-art technical solution in which cache servers at layers independently determine whether to cache a copy of data, in this embodiment of this application, an upper-layer cache server and a lower-layer cache server exchange access frequencies of data, and then determine whether to cache data, which helps to resolve problems of the prior art in which the cache servers at layers independently determine whether to cache data, for example, a waste of network storage resources, relatively low cache efficiency of a medium-layer cache server, and a relatively long time of responding to a data request of a user.

Optionally, the method further includes: requesting, by the first cache server, the second cache server to swap cache locations of the first data and the second data.

It may be understood that the copy of the first data is already cached in the second cache server. If the first cache server also caches the copy of the first data, overheads of network resources are increased. To avoid the problem, in the embodiments of this application, copies of data that are cached in servers at layers should be as few as possible. Therefore, there is no need to cache the copy of the first data in both the first cache server and the second cache server, and the copy of the first data needs to be stored to only the first cache server at the lower layer while the copy of the second data, whose access frequency is lower than the access frequency of the first data, is moved from the first cache server to the second cache server at the upper layer. In other words, the cache locations of the first data and the second data are swapped. In this way, a waste of network resources can be avoided.

The following describes in detail how the first cache server and the second cache server swap the cache locations of the first data and the second data.

The foregoing example is still used for description. For example, the frequency f3 is lower than the first access frequency.

In this case, different from Case 1, the first cache server not only returns the copy of the first data to the cache server at the lower layer, but also requests the second cache server to swap the cache locations of the first data and the second data; or locations of the copy of the first data and the copy of the second data in the cache servers are swapped later.

The following describes a process of swapping the cache locations of the first data and the second data.

That the first cache server requests the second cache server to swap the cache locations of the first data and the second data includes:

sending, by the first cache server, swap signaling to the second cache server, where the swap signaling carries the copy of the second data and information that indicates the second access frequency, so that the second cache server deletes the first data cached for the first edge server and caches the second data; and caching, by the first cache server, the first data, and deleting the second data locally cached for the first edge server.

In other words, the first cache server first sends the swap signaling to the second cache server, where the swap signaling is used to request to swap the cache locations of the first data and the second data. The swap signaling carries the copy of the second data and the information that indicates the second access frequency.

It may be understood that once receiving the swap signaling, the second cache server obtains the copy of the second data and learns of the second access frequency. The second cache server deletes, based on the swap signaling, the first data cached for the first edge server, and caches the received copy of the second data.

The first cache server deletes the second data cached for the first edge server and caches the received copy of the first data.

In this way, the copy of the second data that is originally cached in the first cache server is cached in the second cache server while the copy of the first data that is originally cached in the second cache server is cached in the first cache server. Therefore, the first cache server and the second cache server swap the cache locations of the first data and the second data.

It may be understood that caching data with a higher access frequency in a server at a lower layer can reduce a time of responding to a data request of a user.

Then, FIG. 5 is used as an example. The cache server # B returns the updated access frequency (namely, 4) of the data F to the cache server # A. The access frequency of the data F is higher than an access frequency of data C locally cached in the cache server # A, and the cache server # A and the cache server # B swap cache locations of the data C and the data F. The cache server # B deletes the data F and caches a copy of the data C. The cache server # A deletes the data C and caches the copy of the data F.

Assuming that the access request for requesting the data F is from an edge server # C, a cache queue of the edge server # C changes from (A, B, C, D, E, F, H, I, J) to (A, B, F, C, D, E, H, I, J).

It should be noted that herein, a cache queue stored in a cache server and a cache queue stored in an edge server need to be distinguished. As described above with reference to FIG. 3, the cache queue in the edge server, which is a logical cache queue, includes a physical cache space allocated by each medium-layer server for an edge server and a physical cache space of the edge server. The cache queue stored in the cache server # B shown in FIG. 5 is a physical cache queue maintained on the cache server # B.

It may be understood that the first cache server is a lower-layer server of the second cache server, and a frequency at which the first edge server accesses the first data is higher than a frequency at which the first edge server accesses the second data. Therefore, swapping the copy of the first data from the second cache server to the first cache server is caching data with a higher access frequency at a location closer to the user. In this way, access efficiency for the first data can be improved, and latency can be shortened. In other words, when data becomes "popular" to an edge server, the data moves forwards in a cache queue of the edge server and is physically closer to a lower-layer cache server, so that the data is closer to the user.

Optionally, the cache locations of the first data and the second data are swapped, and correspondingly, record locations of the first access frequency and the second access frequency are swapped. In other words, a cache server that caches data records an access frequency of the data.

In this embodiment of this application, for an edge server, the following case may occur in a process of caching the data with the higher access frequency at the location closer to the user.

Figure 6:
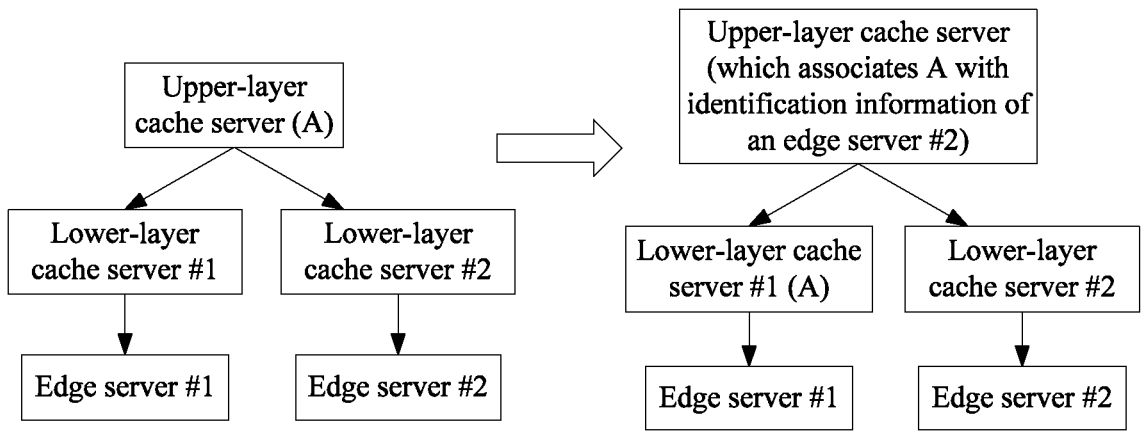
FIG. 6 shows an example of a case of adjusting a cache location of data.

FIG. 6 shows an example of a case of adjusting a cache location of data.

For example, data A cached in an upper-layer cache server is relatively "popular" to an edge server #1, and the data A needs to be cached in a server at a lower layer. The data A is relatively "unpopular" to an edge server #2, and the data A needs to be cached in a server at a further upper layer. Therefore, the lower-layer cache server #1 caches the data A. In addition, the upper-layer cache server associates the cached data A with identification information of the edge server #2, to indicate that the data A cached in the upper-layer cache server is for the edge server #2. In this way, for the edge server #1, it is considered that there is still only one copy of the data A in a cache queue of the edge server #1. Likewise, for the edge server #2, there is still only one copy of the data A in a cache queue of the edge server #2.

Optionally, before the second cache server deletes, based on the swap signaling, the first data locally cached for the first edge server, the method further includes:

receiving, by the second cache server, a second access request sent by a third cache server, where the second access request is used to request the first data, and the second access request is from a second edge server; and returning, by the second cache server, a copy of the first data and a third access frequency to the third cache server, where the third access frequency is a frequency at which the second cache edge server accesses the first data and that is recorded by the second cache server.

In other words, for the first access request that is used to request the first data and that is from the first edge server, the second cache server returns the first access frequency; for the second access request that is used to request the first data and that is from the second edge server, the second cache server returns the third access frequency.

Likewise, the second access request may carry identification information of the second edge server, to indicate that the second access request is from the second edge server.

Figure 7:
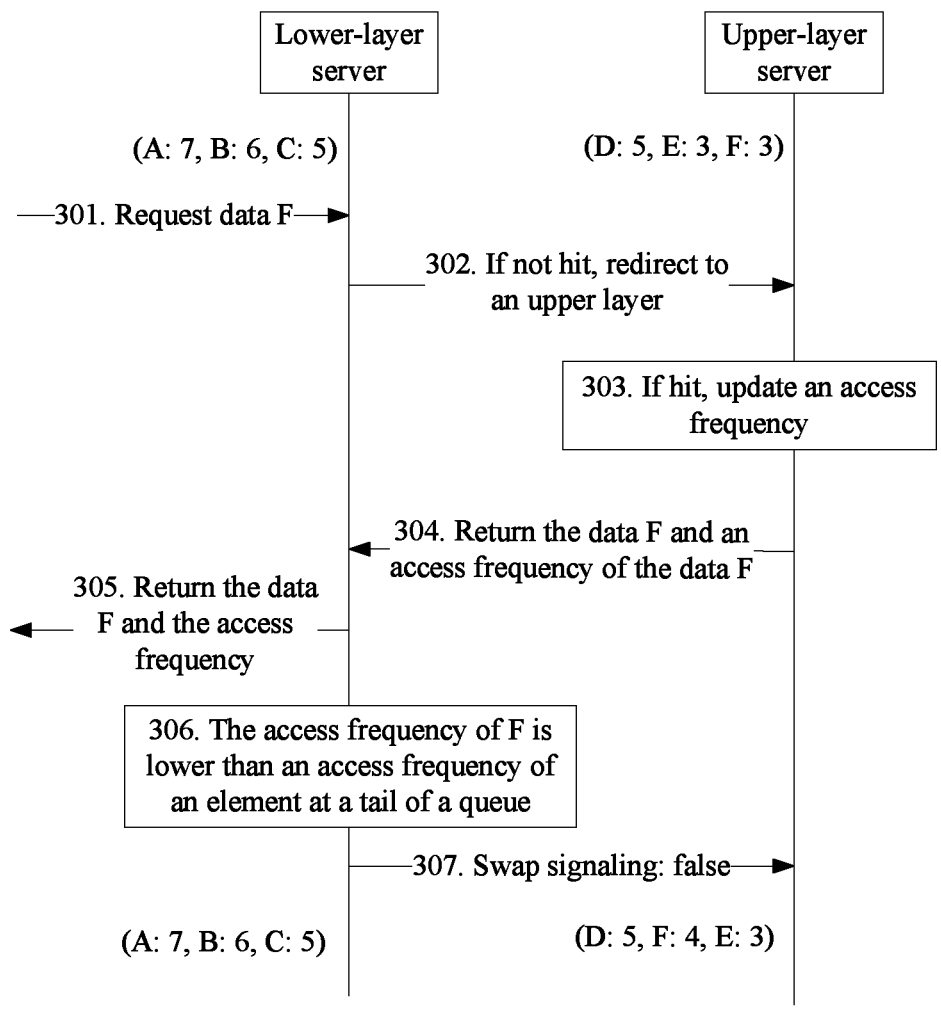
FIG. 7 shows an example of a data access method according to an embodiment of this application.
Figure 8:
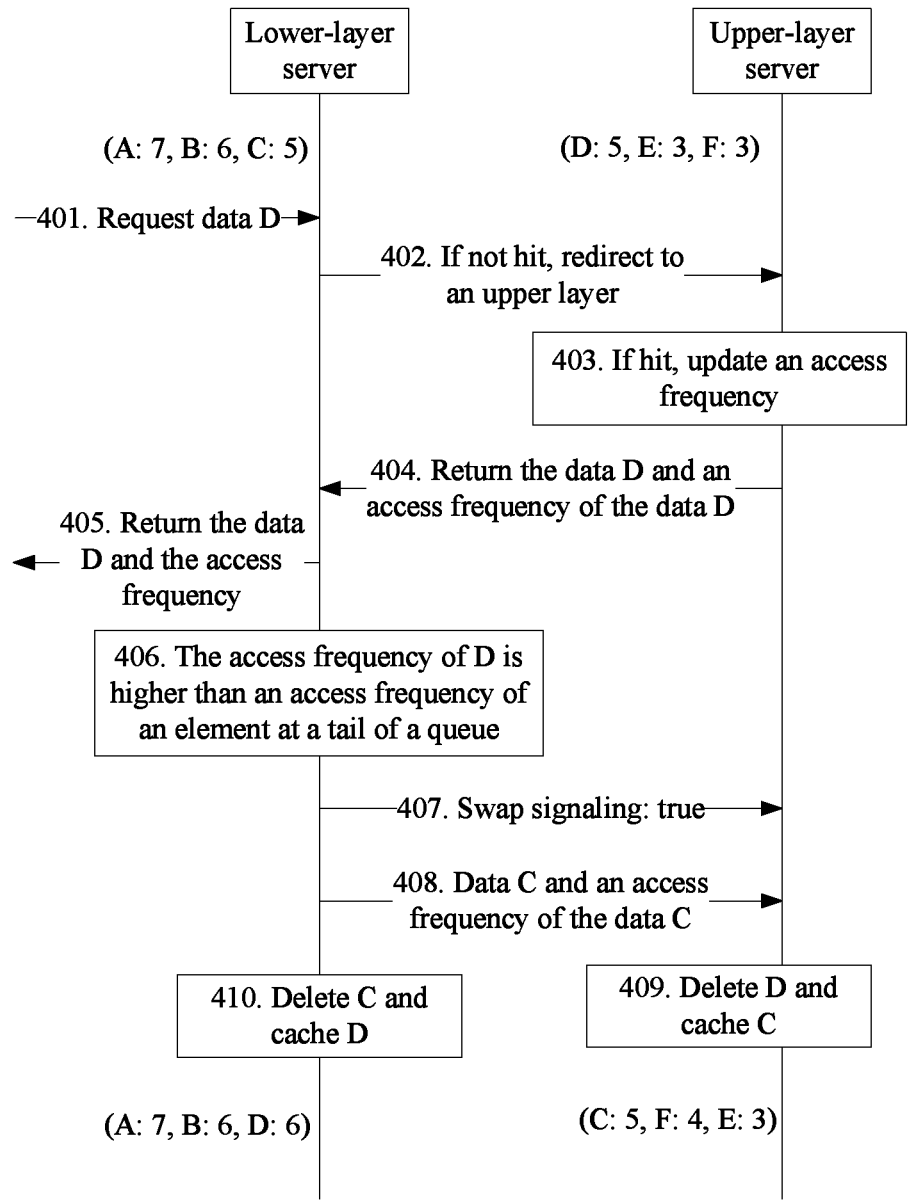
FIG. 8 shows another example of a data access method according to an embodiment of this application.

The following describes, with reference to FIG. 7 and FIG. 8, a data access method according to embodiments of this application with examples.

FIG. 7 shows an example of a data access method according to an embodiment of this application.

First, it is assumed that data cached in a lower-layer server includes data A, data B, and data C whose access frequencies are 7, 6, and 5 respectively, and data cached in an upper-layer server includes data D, data E, and data F whose access frequencies are 5, 3, and 3 respectively.

301. The lower-layer server receives an access request for requesting the data F.

302. If the data F is not hit in the lower-layer server, redirect the access request to the upper-layer server.

303. If the data F is hit in the upper-layer server, update the access frequency of the data F.

To be specific, the access frequency of the data F is updated from 3 to 4.

304. The upper-layer server returns a copy of the data F and the updated access frequency of the data F to the lower-layer server.

305. The lower-layer server returns the copy of the data F to a server at a further lower layer.

Alternatively, the updated access frequency of the data F may be further returned.

306. The lower-layer server determines that the updated access frequency of the data F is lower than an access frequency of an element at a tail of a cache queue, and determines that a cache location of the data F does not need to be adjusted.

It can be learned from the foregoing description that the access frequency of the element at the tail of the queue on the lower-layer server is the lowest. Therefore, the access frequency of the data F is directly compared herein with the access frequency of the element at the tail of the queue. Herein, the element at the tail of the queue is the data C whose access frequency is 5.

Till this moment, the access procedure ends.

If the upper-layer server does not receive swap signaling, cache locations of the data do not need to be swapped by default. Alternatively, step 307 may be performed.

307. The lower-layer server sends swap signaling to the upper-layer server.

The swap signaling indicates false, to notify the upper-layer server that a swapping operation does not need to be performed.

FIG. 8 shows another example of a data access method according to an embodiment of this application.

FIG. 8 has the same assumption as FIG. 7.

401 to 405 are similar to the foregoing steps 301 to 405, and details are not described herein again. The only difference is that an access request is used to request the data D this time.

406. The lower-layer server determines that an updated access frequency (namely, 6) of the data D is higher than the access frequency (namely, 5) of the data C that is an element at a tail of the queue, and therefore cache locations of the data D and the data C need to be swapped.

407. The lower-layer server sends swap signaling to the upper-layer server.

The swap signaling indicates true, to notify the upper-layer server that a swapping operation needs to be performed.

408. The lower-layer server sends a copy of the data C and the access frequency of the data C to the upper-layer server.

Alternatively, step 408 may not be performed. The swap signaling in step 407 carries a copy of the data C and information that indicates the access frequency of the data C, to reduce signaling overheads.

409. After receiving the copy of the data C and the access frequency of the data C, the upper-layer server deletes the data D and caches the copy of the data C.

410. The lower-layer server deletes the data C and caches the copy of the data D received in step 404.

Further, the lower-layer server stores the updated access frequency of the data D, and the upper-layer server stores the access frequency of the data C.

Till this moment, the access procedure ends.

The data access method provided in the embodiments of this application can avoid a problem that storage resources of a medium-layer cache server are wasted when data is repeatedly cached in cache servers at a plurality of layers. Further, updating of a cache location of data is implemented in a distributed manner, to avoid performance bottlenecks.

Experiments show that, compared with conventional solutions (for example, least recently used (LRU)) algorithm, the data access method provided in this application uses a four-layer cache, and a cache server at each layer can cache 10 pieces of content. A data server stores 100 pieces of content, 10000 access requests are generated in total, and the requests are subject to Zipf distribution. A hop count from a user to a hit cache server reduces by 15.7%. A cache hit ratio increases from 84.2% to 88.7%, and especially, a hit ratio of "popular" data (or content) is effectively improved. In addition, load on the data server reduces by 28.7%, thereby effectively improving scalability of the data server.

In the data access method according to the embodiments of this application, based on a data access status of a user, cache locations of data with a relatively high access frequency and data with a relatively low access frequency are continually adjusted through interaction between an upper-layer cache server and a lower-layer cache server, so that the cache location of the data with the relatively high access frequency moves to a cache server at a lower layer. This not only can reduce a time of responding to a data request of the user and increase a cache hit ratio, but also can reduce wastes of storage resources and network resources can be reduced, reduce the load on the data server, and improve cache efficiency.

The foregoing describes the data access method according to the embodiments of this application in detail with reference to FIG. 3 to FIG. 8. The following describes a data access apparatus and a server according to embodiments of this application with reference to FIG. 9 and FIG. 12.

Figure 9:
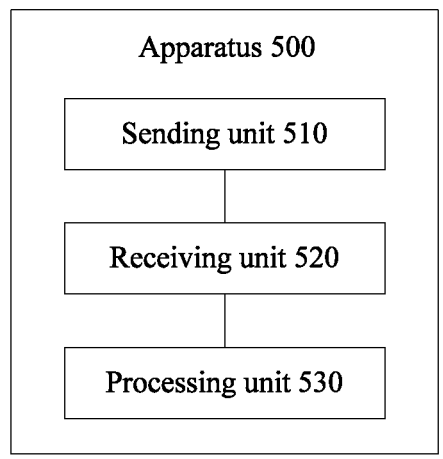
FIG. 9 is a schematic block diagram of a data access apparatus 500 according to an embodiment of this application.

FIG. 9 is a schematic block diagram of a data access apparatus 500 according to an embodiment of this application. The apparatus 500 may correspond to the first cache server in the foregoing method embodiments. As shown in FIG. 9, the apparatus 500 includes:

a sending unit 510, configured to send a first access request to a second cache server, where the first access request is used to request first data, and the first access request is from a first edge server;

a receiving unit 520, configured to receive a copy of the first data and a first access frequency that are returned by the second cache server, where the first access frequency is a frequency at which the first edge server accesses the first data and that is recorded by the second cache server; and a processing unit 530, configured to determine whether a second access frequency lower than the first access frequency exists, where the second access frequency is a frequency at which the first edge server accesses second data and that is recorded by the first cache server, and the second data is locally cached in the first cache server, where the processing unit 530 is further configured to cache the copy of the first data when the second access frequency exists.

Units and the foregoing other operations or functions of the apparatus 500 in this embodiment of this application are used to implement corresponding procedures performed by the first cache server in the embodiments of the data access method provided in this application. For brevity, details are not described herein again.

The apparatus 500 may correspond to the first cache server in the method embodiments, and corresponding modules or units perform corresponding steps. For example, the sending unit (a transmitter) performs a sending step in the method embodiments, the receiving unit (a receiver) performs a receiving step in the method embodiments, and the processing unit (a processor) may perform other steps different from sending and receiving. For specific functions of the units, refer to corresponding method embodiments. The sending unit and the receiving unit can form a transceiver unit, and the transmitter and the receiver can form a transceiver, to jointly implement a transceiving function. There may be one or more processors.

Optionally, the apparatus 500 may be the first cache server in the foregoing method embodiments or a chip installed in the first cache server.

Figure 10:
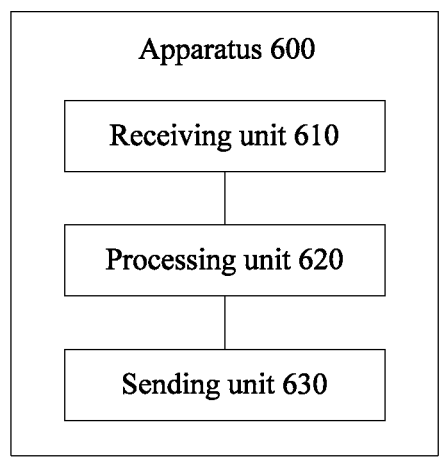
FIG. 10 is a schematic block diagram of a data access apparatus 600 according to an embodiment of this application.

FIG. 10 is a schematic block diagram of a data access apparatus 600 according to an embodiment of this application. The apparatus 600 may correspond to the second cache server in the foregoing method embodiments. As shown in FIG. 10, the apparatus 600 includes:

a receiving unit 610, configured to receive a first access request sent by a first cache server, where the first access request is used to request first data, and the first access request is from a first edge server;

a processing unit 620, configured to determine whether the first data is locally cached; and a sending unit 630, configured to return, when it is determined that the first data is locally cached, a copy of the first data and a first access frequency to the first cache server, where the first access frequency is a frequency at which the first edge server accesses the first data and that is recorded by the second cache server.

Units and the foregoing other operations or functions of the apparatus 600 in this embodiment of this application are used to implement corresponding procedures performed by the second cache server in the embodiments of the data access method provided in this application. For brevity, details are not described herein again.

The apparatus 600 may correspond to the second cache server in the method embodiments, and corresponding modules or units perform corresponding steps. For example, the sending unit (a transmitter) performs a sending step in the method embodiments, the receiving unit (a receiver) performs a receiving step in the method embodiments, and the processing unit (a processor) may perform other steps different from sending and receiving. For specific functions of the units, refer to corresponding method embodiments. The sending unit and the receiving unit can form a transceiver unit, and the transmitter and the receiver can form a transceiver, to jointly implement a transceiving function. There may be one or more processors.

Optionally, the apparatus 600 may be the second cache server in the foregoing method embodiments or a chip installed in the second cache server.

Figure 11:
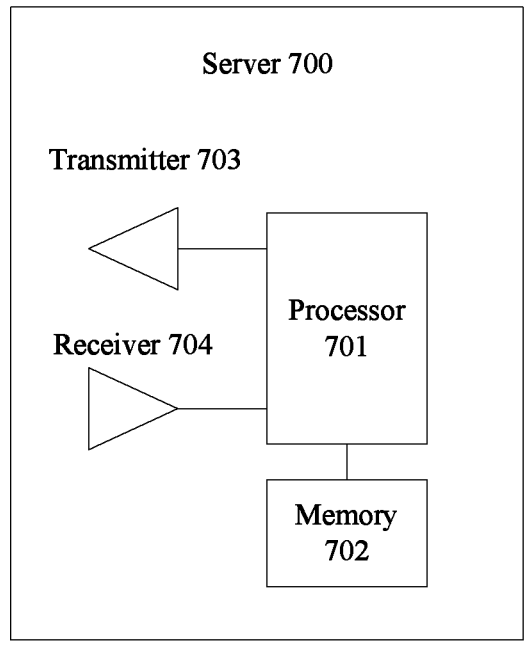
FIG. 11 is a schematic structural diagram of a server 700 according to an embodiment of this application.

FIG. 11 is a schematic structural diagram of a server 700 according to an embodiment of this application. As shown in FIG. 11, the server 700 includes one or more processors 701, one or more memories 702, and one or more transceivers (each transceiver includes a transmitter 703 and a receiver 704). The transmitter 703 sends a signal through an antenna or the receiver 704 receives a signal through an antenna. The memory 702 stores a computer program instruction (or code). The processor 701 executes the computer program instruction stored in the memory 702, to implement corresponding procedures and/or operations performed by the first cache server in the embodiments of the data access method provided in this application. For brevity, details are not described herein again.

It should be noted that the apparatus 500 shown in FIG. 9 may be implemented by the server 700 shown in FIG. 11. For example, the sending unit 510 shown in FIG. 9 may be implemented by the transmitter 703 shown in FIG. 11, the receiving unit 520 may be implemented by the receiver 704, and the processing unit 530 may be implemented by the processor 701.

Figure 12:
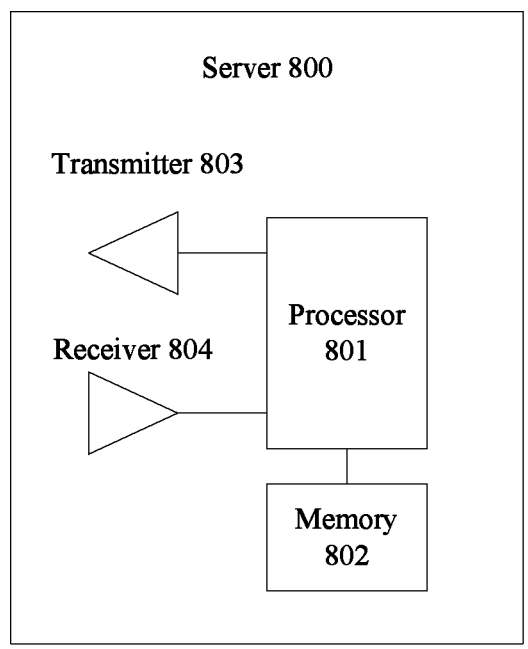
FIG. 12 is a schematic structural diagram of a server 800 according to an embodiment of this application.

FIG. 12 is a schematic structural diagram of a server 800 according to an embodiment of this application. As shown in FIG. 12, the server 800 includes one or more processors 801, one or more memories 802, and one or more transceivers (each transceiver includes a transmitter 803 and a receiver 804). The transmitter 803 sends a signal through an antenna or the receiver 804 receives a signal through an antenna. The memory 802 stores a computer program instruction (or code). The processor 801 executes the computer program instruction stored in the memory 802, to implement corresponding procedures and/or operations performed by the second cache server in the embodiments of the data access method provided in this application. For brevity, details are not described herein again.

Likewise, the apparatus 600 shown in FIG. 10 may be implemented by the server 800 shown in FIG. 12. For example, the receiving unit 610 shown in FIG. 10 may be implemented by the receiver 804 shown in FIG. 12, the processing unit 620 may be implemented by the processor 801, and the sending unit 630 may be implemented by the transmitter 803.

In addition, this application provides a computer readable storage medium, where the computer readable storage medium stores a computer instruction, and when the computer instruction is run on a computer, the computer performs corresponding operations and/or procedures performed by the first cache server in the data access method according to the embodiments of this application.

In addition, this application provides a computer readable storage medium, where the computer readable storage medium stores a computer instruction, and when the computer instruction is run on a computer, the computer performs corresponding operations and/or procedures performed by the second cache server in the data access method according to the embodiments of this application.

This application further provides a computer program product, where the computer program product includes computer program code, and when the computer program code is run on a computer, the computer performs corresponding operations and/or procedures performed by the first cache server in the data access method according to the embodiments of this application.

This application further provides a computer program product, where the computer program product includes computer program code, and when the computer program code is run on a computer, the computer performs corresponding operations and/or procedures performed by the second cache server in the data access method according to the embodiments of this application.

This application further provides a chip (or chip system), including a memory and a processor. The memory is configured to store a computer program, and the processor is configured to invoke the computer program from the memory and run the computer program, so that a network device on which the chip is installed performs corresponding operations and/or procedures performed by the first cache server in the data access method according to the embodiments of this application.

This application further provides a chip (or chip system), including a memory and a processor. The memory is configured to store a computer program, and the processor is configured to invoke the computer program from the memory and run the computer program, so that a network device on which the chip is installed performs corresponding operations and/or procedures performed by the second cache server in the data access method according to the embodiments of this application.

The network device herein may be, for example, a cache server.

In the foregoing embodiments, the processor may be a central processing unit (CPU), a microprocessor, an application-specific integrated circuit (ASIC), one or more integrated circuits configured to control program execution of the solutions of this application, or the like. For example, the processor may include a digital signal processor device, a microprocessor device, an analog-to-digital converter, a digital-to-analog converter, and the like. The processor may allocate, based on functions of each device, control and signal processing functions of a mobile device to the devices. In addition, the processor may include a function of operating one or more software programs, where the software programs may be stored in the memory.

The functions of the processor may be implemented by hardware, or may be implemented by hardware executing corresponding software. The hardware or software includes one or more modules corresponding to the foregoing functions.

The memory may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can carry or store expected program code in a form of an instruction or a data structure and that can be accessed by a computer; but is not limited thereto.

Figure 13:
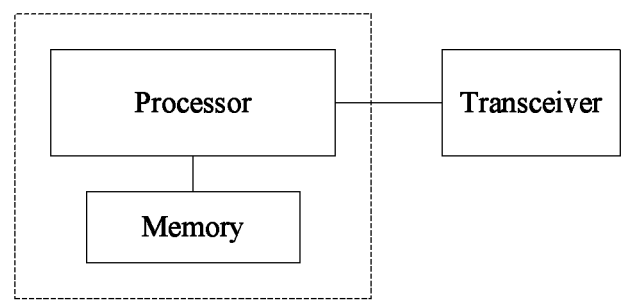
FIG. 13 is a schematic diagram of a structure including a processor and a memory.
Figure 14:
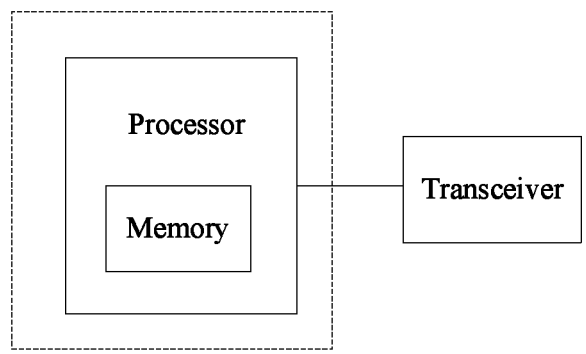
FIG. 14 is a schematic diagram of another structure including a processor and a memory.

Optionally, the processor and the memory shown in FIG. 11 and FIG. 12 are physically independent units. FIG. 13 is a schematic diagram of a structure including a processor and a memory. Alternatively, the memory may be integrated with the processor. FIG. 14 is a schematic diagram of another structure including a processor and a memory.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes a plurality of instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data access method, wherein the method comprises:
   sending, by a first cache server, a first access request to a second cache server, wherein the first access request is used to request first data, and wherein the first access request is from a first edge server;
   receiving, by the first cache server, a copy of the first data and a first access frequency that are returned by the second cache server, wherein the first access frequency is a frequency at which the first edge server accesses the first data and that is recorded by the second cache server;
   determining, by the first cache server, whether a second access frequency lower than the first access frequency exists, wherein the second access frequency is a frequency at which the first edge server accesses second data and that is recorded by the first cache server, and wherein the second data is locally cached in the first cache server; and
   in response to determining that the second access frequency exists, caching, by the first cache server, the copy of the first data.

2. The method according to claim 1, wherein the method further comprises:
   requesting, by the first cache server, the second cache server to swap cache locations of the first data and the second data.

3. The method according to claim 2, wherein the requesting, by the first cache server, the second cache server to swap cache locations of the first data and the second data comprises:
   sending, by the first cache server, swap signaling to the second cache server, wherein the swap signaling carries a copy of the second data and information that indicates the second access frequency, wherein the second cache server deletes the first data cached for the first edge server and caches the second data;
   caching, by the first cache server, the first data; and
   deleting, by the first cache server, the second data locally cached for the first edge server.

4. The method according to claim 1, wherein the method further comprises:
   recording, by the first cache server, the first access frequency.

5. The method according to claim 1, wherein the first cache server stores a cache queue, wherein the cache queue stores an access frequency of each piece of locally cached data, wherein the access frequencies of the data in the cache queue are arranged in ascending or descending order; and
   wherein the determining, by the first cache server, whether a second access frequency lower than the first access frequency exists comprises:
   determining, by the first cache server, whether a lowest access frequency in the cache queue is lower than the first access frequency; and
   if the lowest access frequency in the cache queue is higher than the first access frequency, determining, by the first cache server, that the second access frequency does not exist; or
   if the lowest access frequency in the cache queue is lower than the first access frequency, determining, by the first cache server, that the second access frequency exists.

6. The method according to claim 1, wherein the first access request carries identification information of the first edge server to indicate that the first access request is from the first edge server.

7. A data access method, wherein the method comprises:
receiving, by a second cache server, a first access request sent by a first cache server, wherein the first access request is used to request first data, and wherein the first access request is from a first edge server; and in response to determining that the first data is locally cached, returning, by the second cache server, a copy of the first data and a first access frequency to the first cache server, wherein the first access frequency is a frequency at which the first edge server accesses the first data and that is recorded by the second cache server.

8. The method according to claim 7, wherein the method further comprises:
receiving, by the second cache server, swap signaling sent by the first cache server, wherein the swap signaling carries a copy of second data and information that indicates a second access frequency, wherein the swap signaling is sent to the second cache server when the first cache server determines that the second access frequency locally exists, wherein the second access frequency is lower than the first access frequency, wherein the second access frequency is a frequency at which the first edge server accesses the second data and that is recorded by the first cache server, and wherein the second data is locally cached in the first cache server;

deleting, by the second cache server and based on the swap signaling, the first data locally cached for the first edge server; and locally caching, by the second cache server, the second data.

9. The method according to claim 8, wherein before the deleting, by the second cache server and based on the swap signaling, the first data locally cached for the first edge server, the method further comprises:
receiving, by the second cache server, a second access request sent by a third cache server, wherein the second access request is used to request the first data, and wherein the second access request is from a second edge server; and returning, by the second cache server, the copy of the first data and a third access frequency to the third cache server, wherein the third access frequency is a frequency at which the second edge server accesses the first data and that is recorded by the second cache server.

10. The method according to claim 8, wherein the method further comprises:
recording, by the second cache server, the second access frequency.

11. The method according to claim 7, wherein the first access request carries identification information of the first edge server to indicate that the first access request is from the first edge server.

12. The method according to claim 7, wherein before the returning, by the second cache server, a copy of the first data and a first access frequency to the first cache server, the method further comprises:
updating, by the second cache server, a recorded historical frequency at which the first edge server accesses the first data to obtain the first access frequency, wherein the first access frequency is a frequency at which the first edge server accesses the first data, counting the first access request.

13. A data access apparatus, comprising:
a transmitter, the transmitter configured to send a first access request to a second cache server, wherein the first access request is used to request first data, and wherein the first access request is from a first edge server;

a receiver, the receiver configured to receive a copy of the first data and a first access frequency that are returned by the second cache server, wherein the first access frequency is a frequency at which the first edge server accesses the first data and that is recorded by the second cache server; and at least one processor, the at least one processor configured to:
determine whether a second access frequency lower than the first access frequency exists, wherein the second access frequency is a frequency at which the first edge server accesses second data and that is recorded by the apparatus, and wherein the second data is locally cached in the apparatus; and cache the copy of the first data in response to determining that the second access frequency exists.

14. The apparatus according to claim 13, wherein the at least one processor is further configured to request the second cache server to swap cache locations of the first data and the second data.

15. The apparatus according to claim 14, wherein:
the transmitter is configured to send swap signaling to the second cache server, wherein the swap signaling carries a copy of the second data and information that indicates the second access frequency, wherein the second cache server deletes the first data cached for the first edge server and caches the second data; and the at least one processor is configured to cache the first data and delete the second data cached for the first edge server.

16. The apparatus according to claim 13, wherein the at least one processor is further configured to record the first access frequency.

17. The apparatus according to claim 13, wherein the apparatus stores a cache queue, wherein the cache queue stores an access frequency of each piece of locally cached data, and wherein the access frequencies of the data in the cache queue are arranged in ascending or descending order; and wherein the at least one processor is configured to:
determine whether a lowest access frequency in the cache queue is lower than the first access frequency; and if the lowest access frequency in the cache queue is higher than the first access frequency, determine that the second access frequency does not exist; or if the lowest access frequency in the cache queue is lower than the first access frequency, determine that the second access frequency exists.

18. The apparatus according to claim 13, wherein the first access request carries identification information of the first edge server to indicate that the first access request is from the first edge server.

* * * * *